(12) United States Patent
Chatow et al.

(10) Patent No.: US 8,531,401 B2
(45) Date of Patent: Sep. 10, 2013

(54) COMPUTER ACCESSORY DEVICE

(75) Inventors: Ehud Chatow, Palo Alto, CA (US);
William D. Holland, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

(21) Appl. No.: 12/540,689

(22) Filed: Aug. 13, 2009

(65) Prior Publication Data

US 2011/0037700 A1 Feb. 17, 2011

(51) Int. Cl.
*G06F 3/033* (2013.01)
*G09G 5/08* (2006.01)

(52) U.S. Cl.
USPC .......................................... 345/166; 345/156

(58) Field of Classification Search
USPC .................................. 345/156–173
See application file for complete search history.

(56) References Cited

U.S. PATENT DOCUMENTS

| | | | |
|---|---|---|---|
| 5,089,712 A | 2/1992 | Holland | |
| 5,149,980 A | 9/1992 | Ertel et al. | |
| 5,477,042 A | 12/1995 | Wang | |
| 5,612,524 A | 3/1997 | Sant'Anselmo et al. | |
| 5,619,026 A | 4/1997 | Chou et al. | |
| 5,994,710 A * | 11/1999 | Knee et al. | 250/557 |
| 6,303,921 B1 | 10/2001 | Hastings et al. | |
| 6,338,433 B1 | 1/2002 | Drexler | |
| 6,398,117 B1 | 6/2002 | Oakeson et al. | |
| 6,418,244 B2 | 7/2002 | Zhou et al. | |
| 6,455,840 B1 | 9/2002 | Oliver et al. | |
| 6,525,306 B1 * | 2/2003 | Bohn | 250/221 |
| 6,550,685 B1 | 4/2003 | Kindberg | |
| 6,565,003 B1 | 5/2003 | Ma | |
| 6,604,682 B2 | 8/2003 | Wakamiya et al. | |
| 6,674,919 B1 | 1/2004 | Ma et al. | |
| 6,710,768 B2 | 3/2004 | Muranami | |
| 6,869,015 B2 | 3/2005 | Cummings et al. | |
| 7,025,269 B2 | 4/2006 | Marshall | |

(Continued)

FOREIGN PATENT DOCUMENTS

| | | |
|---|---|---|
| EP | 0 851 373 A2 | 1/1998 |
| EP | 1 688 891 A1 | 9/2006 |

(Continued)

OTHER PUBLICATIONS

Web Article entitled "HP Unveils Breakthrough CapShare Page-Processing Technology; HP Technology Captures and Stores Text." available at <<http://www.thefreelibrary.com/HP+Unveils+Breakthrough+CapShare+Page-Processing+Technology%3B+HP...-a021118281>>.

(Continued)

*Primary Examiner* — Viet Pham

(57) ABSTRACT

A computer accessory device configured to communicate with a computer includes a two-dimensional sensor array configured to generate image data as the device is moved over a surface. A first memory is configured to store a first set of images based on a first set of the image data. A second memory is configured to store a second set of images based on a second set of the image data. The second set of images is configured to be stitched-together into a stitched-together image. At least one controller is configured to generate navigation information based on the first set of images. The navigation information is indicative of displacement and rotation of the device.

18 Claims, 3 Drawing Sheets

(56) References Cited

U.S. PATENT DOCUMENTS

| | | | |
|---|---|---|---|
| 7,167,604 B2 | 1/2007 | Allen et al. | |
| 2002/0063158 A1* | 5/2002 | Norskog | 235/462.13 |
| 2002/0097225 A1* | 7/2002 | Muranami | 345/166 |
| 2003/0107759 A1 | 6/2003 | Athens et al. | |
| 2003/0182238 A1 | 9/2003 | Brookner et al. | |
| 2004/0028295 A1* | 2/2004 | Allen et al. | 382/313 |
| 2004/0251307 A1 | 12/2004 | Schmidt et al. | |
| 2005/0040240 A1 | 2/2005 | Jones et al. | |
| 2005/0102241 A1 | 5/2005 | Cook et al. | |
| 2005/0199721 A1 | 9/2005 | Chang et al. | |
| 2005/0236484 A1 | 10/2005 | Taylor | |
| 2005/0242568 A1 | 11/2005 | Long et al. | |
| 2005/0269416 A1 | 12/2005 | Sussmeier et al. | |
| 2005/0284944 A1 | 12/2005 | Ming | |
| 2005/0286765 A1* | 12/2005 | Nakayama | 382/182 |
| 2006/0161779 A1 | 7/2006 | Geoffrey | |
| 2007/0086071 A1 | 4/2007 | Gila et al. | |

FOREIGN PATENT DOCUMENTS

| | | |
|---|---|---|
| GB | 2 344 913 A | 6/2000 |
| JP | 59177687 A | 10/1984 |
| JP | 3241483 A | 10/1991 |
| JP | 4251396 A | 9/1992 |
| JP | 5174204 A | 7/1993 |
| JP | 8096097 A | 4/1996 |
| JP | 2004355122 A | 12/2004 |
| WO | 2005/022303 A2 | 3/2005 |

OTHER PUBLICATIONS

Web article entitled "Adobe LiveCycle Barcoded Forms ES"; available at: <<http://www.adobe.com/products/livecycle/barcodedforms/>>.

Web article entitled "Solution: PDF417 2D Barcode data capture"; available at <<http://www.formrouter.com/services/solution_pdf417_capture.htm>>.

Web article entitled "Third Party Software Solutions"; available at <<http://www.5280solutions.com/technology/enterprise/partnerenterprise.aspx>>.

Web article entitled "Bar Code Scanners"; available at <<http://www.motorola.com/business/v/index.jsp?vgnextoid=8b75322c369b5110VgnVCM1000008406b00aRCRD>>.

Web article entitled "Barcode Software with RFID encoding capabilities"; available at <<http://www.pr.com/company-profile/product/4786-6105>>.

Web article entitled "Easily Add Barcode Printing to Access, VB, Web pages, C++, Excel and more."; available at <<http://www.taltech.com/products/activex_barcodes.html>>.

Web article entitled "Transpromo QR Codes, Payment Processing with 2d Barcodes"; available at <<http://www.codezqr.com/default.aspx>>.

Web article entitled "icoya eForms—Bridging the Paper-to-Digital Divide"; available at <<http://www.icoya.de/produkt/eforms/barcode/>>.

* cited by examiner

COMPUTER ACCESSORY DEVICE

BACKGROUND

An optical mouse is one type of hand-held computer accessory device. An optical mouse typically describes a mouse that replaces the rubber ball, rollers, mechanical encoders, and other mechanical parts of a mechanical mouse with a digital optical sensor and a digital signal processor. Rather than relying on the frictional engagement of the rubber ball on a mouse pad, the optical sensor senses patterns of light and dark or colors on a specifically designed mouse pad or work surface. Alternatively, an optical mouse can be made to operate over virtually any surface.

As with a mechanical mouse, an optical mouse can be wired or wireless, and communicate with a computer via infrared or other communication technologies. An optical mouse can also have any number of programmable inputs, such as buttons or switches. Optical mice typically do not have any scanning functionality.

SUMMARY

One embodiment provides a computer accessory device configured to communicate with a computer. The device includes a two-dimensional sensor array configured to generate image data as the device is moved over a surface. A first memory is configured to store a first set of images based on a first set of the image data. A second memory is configured to store a second set of images based on a second set of the image data. The second set of images is configured to be stitched-together into a stitched-together image. At least one controller is configured to generate navigation information based on the first set of images. The navigation information is indicative of displacement and rotation of the device.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
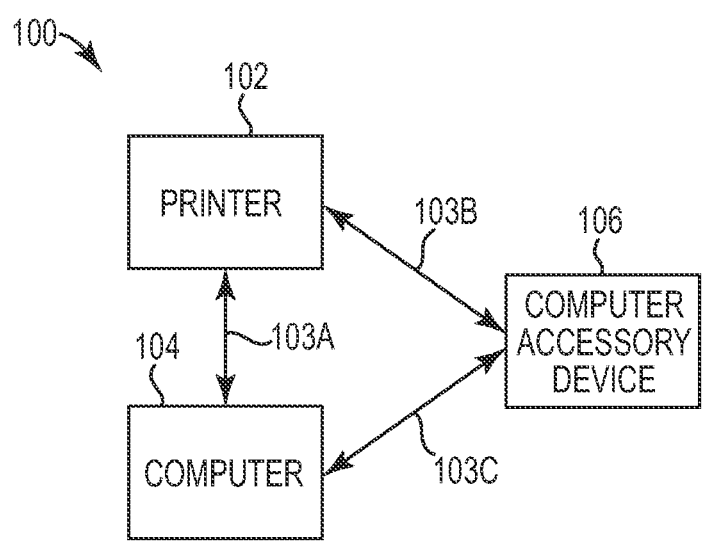
FIG. 1 is a block diagram illustrating a computer system according to one embodiment.

FIG. 1 is a block diagram illustrating a computer system 100 according to one embodiment. Computer system 100 includes printer 102, computer 104, and hand-held computer accessory device 106. Printer 102, computer 104, and device 106 are communicatively coupled to each other via communication links 103A-103C (collectively referred to as communication links 103). Communication links 103 are each a wired communication link or a wireless communication link. In one embodiment, device 106 is an optical mouse (hand-held or credit-card size), mobile phone, or universal serial bus (USB) memory stick.

In one embodiment, device 106 includes a normal mode of operation and a scan mode of operation. A user may switch between the normal mode and the scan mode by, for example, pressing a scan button 213 (FIG. 2) on the device 106. In the normal mode of operation according to one embodiment, device 106 captures navigation images but not scan images. In the scan mode of operation according to one embodiment, device 106 captures both navigation images and scan images. After entering the scan mode, a user can use device 106 in a similar manner as other hand-held scanners, such as the Hewlett-Packard CapShare 910 and 920 products. A user can swipe device 106 across a document, for example, and device 106 captures scan images of the document while the device 106 is moving. In one embodiment, device 106 stitches the scan images together to form an image of the entire document, which is transmitted to computer 104 via communication link 103C or to printer 102 via communication link 103B. In another embodiment, device 106 transmits the scan images to computer 104 via communication link 103C, and then computer 104 stitches the received images together. Device 106 is described in further detail below with reference to FIGS. 2 and 3.

Figure 2:
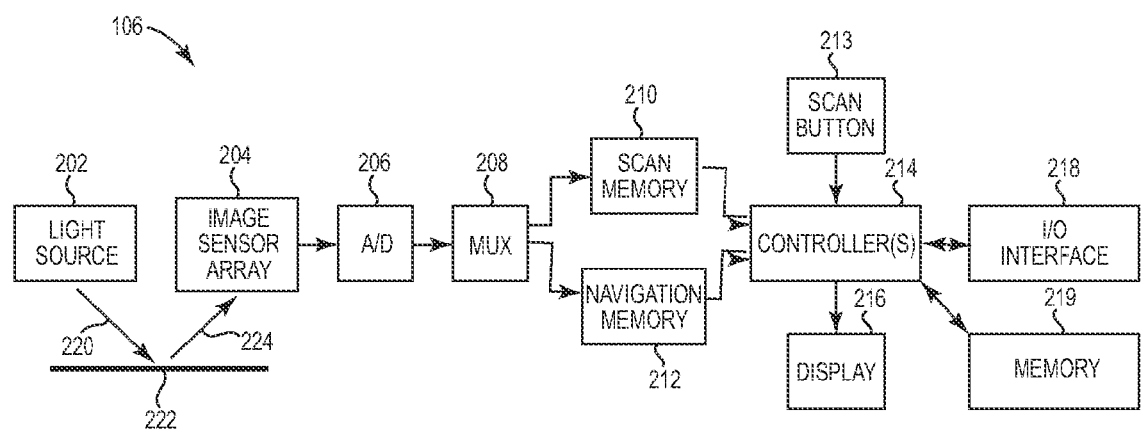
FIG. 2 is a block diagram illustrating a hand-held computer accessory device for use with the computer system shown in FIG. 1 according to one embodiment.

FIG. 2 is a block diagram illustrating a hand-held computer accessory device 106 for use with the computer system 100 shown in FIG. 1 according to one embodiment. Device 106 includes light source 202, image sensor array 204, analog-to-digital (A/D) converter 206, multiplexer (MUX) 208, scan memory 210, navigation memory 212, scan button 213, at least one controller 214, display 216, input/output (I/O) interface 218, and memory 219. In one embodiment, controller 214 is configured to control light source 202, image sensor array 204, A/D converter 206, multiplexer 208, scan memory 210, navigation memory 212, display 216, I/O interface 218, and memory 219, although all of the connections between these elements are not shown to simplify the illustration. In one embodiment, image sensor array 204, A/D converter 206, multiplexer 208, scan memory 210, navigation memory 212, controller 214, I/O interface 218, and memory 219 are implemented in a single semiconductor chip.

In operation according to one embodiment, light source 202 illuminates a surface 222 with light 220 while device 106 is moved relative to the surface 220. The light 220 is reflected by surface 222, as indicated by reflected light 224, and the reflected light 224 is received by image sensor array 204. The reflected light 224 may be directed onto the image sensor array 204 with a lens (not shown) within device 106. In one embodiment, image sensor array 204 is a two-dimensional CMOS image sensor array with a plurality of rows and a plurality of columns of image sensor elements (e.g., a 32×32 pixel array). Image sensor array 204 generates image data (e.g., two-dimensional image frames) based on the received light 224 as the device 106 is moved over the surface 222, and outputs the image data to A/D converter 206. A/D converter 206 converts the received image data into two-dimensional digital images, and outputs the digital images to multiplexer 208.

As shown in the illustrated embodiment, device 106 includes two separate and distinct memories 210 and 212. Memory 210 is a scan memory for storing scan images that are used in a stitching operation to generate a stitched-together image. In one embodiment, the scan images are a sequence of spatially overlapping images. Memory 212 is a navigation memory for storing navigation images that are used to generate navigation information. In one embodiment, controller 214 controls multiplexer 208 to selectively output digital images to either the scan memory 210 or the navigation memory 212 based on the type of the images (e.g., whether the images are navigation type images or scan type images). In one embodiment, controller 214 also stores device usage information (e.g., indicating a history of usage of the device 106) in at least one of the memories 210 and 212.

Controller 214 accesses navigation images from navigation memory 212 and generates navigation information based on these images. The navigation information according to one embodiment is indicative of the displacement and rotation of the device 106. In one embodiment, the navigation images are a sequence of two-dimensional images of the surface 222 on which the device 106 rests, and the relative motion occurring between the captures of a pair of navigation images may be estimated by cross-correlating the images and locating the peak correlation. The peak is displaced in the x and y directions as the image capture locations are displaced in the x and y directions. In one embodiment, controller 214 is configured to cross-correlate pairs of scan images and determine their relative displacement (delta x, delta y) and rotation (delta theta) using techniques disclosed in U.S. Pat. No. 5,149,980, which is hereby incorporated by reference herein. Thus, device 106 according to one embodiment is able to determine displacement and rotation information for use in both navigation and image stitching using a single two-dimensional image sensor 204, rather than using multiple sensors like other hand-held scanner devices.

Controller 214 accesses scan images from scan memory 210 and performs a stitching operation to combine these images into a stitched-together image. In one embodiment, controller 214 is configured to store stitched-together images in memory 219. In one embodiment, controller 214 associates a set of navigation information with each scan image to facilitate the stitching operation (e.g., associates two-dimensional position information and rotation information with each scan image to indicate the position and rotation of device 106 when the scan image was captured). In this manner, each scan image is "position tagged". In one embodiment, controller 214 causes scan images and stitched-together images to be displayed on display 216 while device 106 is being used for scanning to aid a user in the scanning process (e.g., to guide the user scan path by showing the region captured). Controller 214 according to one embodiment is also configured to process the scan images to read 1D and 2D barcodes and 1D and 2D color tags, and to perform optical character recognition (OCR) on text in the scan images and display the results on display 216.

Controller 214 outputs the generated navigation information to input/output interface 218, which transmits the navigation information to computer 104 via communication link 103C (FIG. 1). In one embodiment, computer 104 uses the received navigation information to control a screen pointer on a display screen. In one embodiment, controller 214 also outputs scan images and stitched-together images to input/output interface 218, which transmits the images to computer 104 via communication link 103C for display and potentially printing, or directly to printer 102 via communication link 103B for printing. In one embodiment, input/output interface 218 is configured to wirelessly transmit the images and navigation information via communication links 103B and 103C.

In one embodiment, the image data for the navigation images in navigation memory 212 is generated in a time-interleaved manner with the image data for the scan images in scan memory 210. For example, sensor array 204 may capture ten consecutive frames for navigation, followed by one frame for scanning, followed by another ten consecutive frames for navigation, and so on. In another embodiment, the sensor array 204 is configured to concurrently generate image data for both navigation images and scan images. For example, for a given frame captured by sensor array 204, a smaller portion of the frame (e.g., a 16×16 pixel subset of a 32×32 pixel frame) may be used for navigation while a larger portion of the frame (e.g., the entire frame) may be used for scanning.

In one embodiment, controller 214 is configured to control light source 202 and sensor array 204 and cause the image data for the scan images to be generated using illumination settings (e.g., illumination settings of wavelength and intensity) and an exposure setting that differ from those used for the image data for the navigation images. In one embodiment, the illumination and exposure for the scan images are chosen to capture color images or gray scale images with better color or gray level information than the navigation images, and the illumination and exposure for the navigation images are chosen to best capture the surface texture of surface 222. In one embodiment, a color scan image is generated by device 106 by using a light source 202 that includes red, green and blue LEDs, and that sequentially illuminates the surface 222 with each of these LEDs in turn. A monochrome CMOS image sensor may then be used for image sensor 204 to capture a red scan image, a green scan image, and a blue scan image, which can be combined into a single color image. In another embodiment, device 106 is configured to capture color scan images by using a white LED for light source 202 and a color matrix CMOS sensor for image sensor 204. Other types of illumination sources may also be used for light source 202, such as ultraviolet or infrared LEDS, to provide visible or invisible illumination. For example, ultraviolet or infrared illumination sources could be used to detect ultraviolet or infrared inks in security printing applications (e.g., track and trace applications).

It will be understood by a person of ordinary skill in the art that functions performed by device 106 may be implemented in hardware, software, firmware, or any combination thereof. The implementation may be via a microprocessor, programmable logic device, or state machine. Components of the device 106 may reside in software on one or more computer-readable mediums that store computer-executable instructions for performing a method. The term computer-readable medium as used herein is defined to include any kind of memory, volatile or non-volatile, such as floppy disks, hard disks, CD-ROMs, flash memory, read-only memory, and random access memory.

Figure 3:
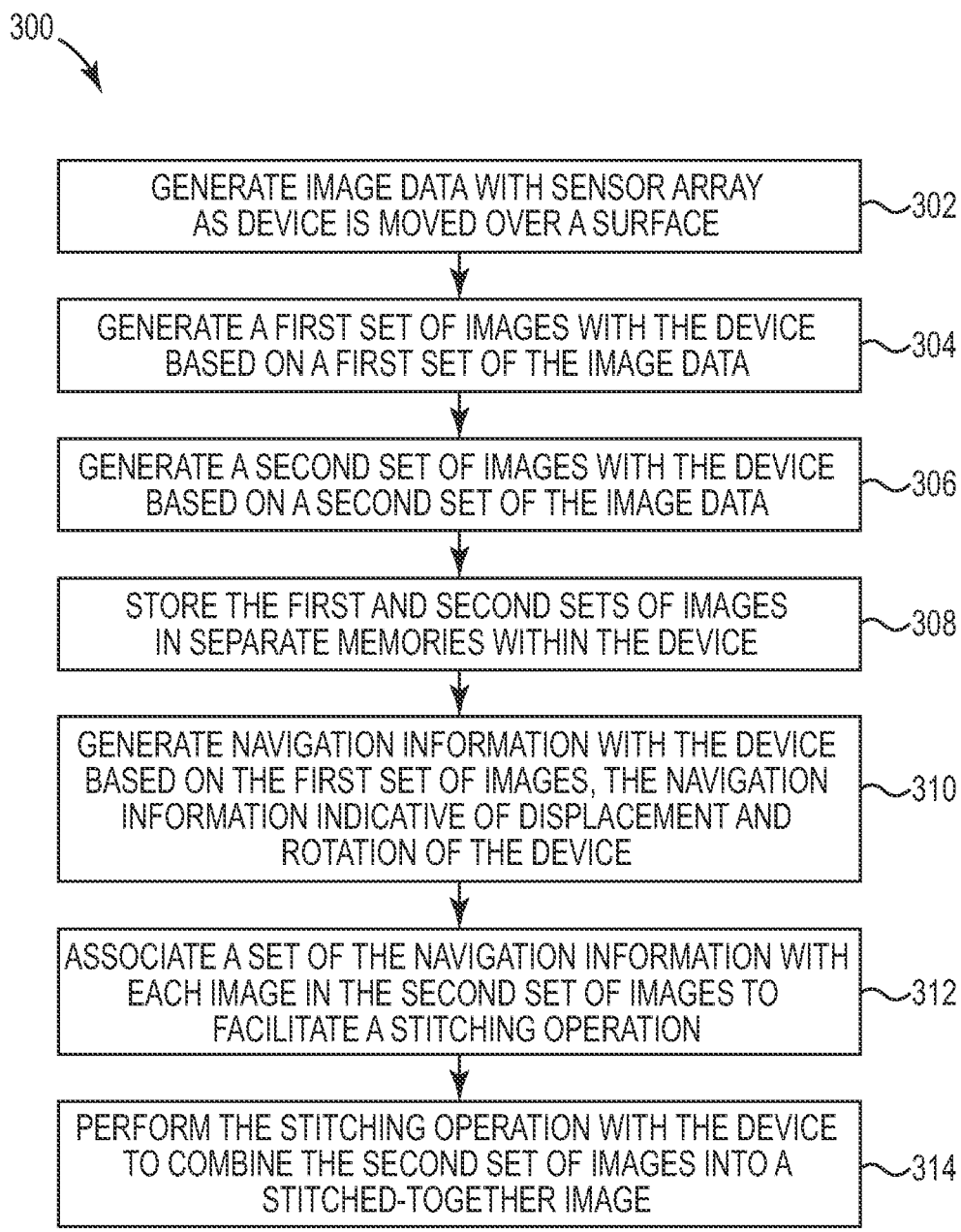
FIG. 3 is a flow diagram illustrating a method of operating the hand-held computer accessory device shown in FIG. 2 according to one embodiment.

FIG. 3 is a flow diagram illustrating a method 300 of operating the hand-held computer accessory device 106 shown in FIG. 2 according to one embodiment. At 302 in method 300, image data is generated by the sensor array 204 as the device 106 is moved over a surface 222. At 304, a first set of images is generated by the device 106 based on a first set of the image data. At 306, a second set of images is generated by the device 106 based on a second set of the image data. At 308, the first and second sets of images are stored in separate memories 210 and 212 in the device 106. At 310, navigation information is generated by the device 106 based on the first set of images. In one embodiment, the navigation information is indicative of displacement and rotation of the computer accessory device. At 312, a set of the navigation information is associated with each image in the second set of images to facilitate a stitching operation. At 314, the stitching operation is performed by the device 106 to combine the second set of images into a stitched-together image.

One embodiment provides an optical mouse device with extended functionality, including image capture and stitching for scanning purposes, using a single two-dimensional image sensor for both scanning and navigation. The combination of optical mouse, optical navigation, and image stitching technologies according to one embodiment enables a hand-held image capture device that links the world of print to the on-line world. The device can be used for the offline capture of very small printed tags and barcodes and other printed items without the noise and artifacts that can be caused in other devices by external lighting conditions, glare, or shadows, and without the need to focus an optical "camera". The optical mouse can also be equipped with a GPS chip to enable location profiling. The optical mouse according to one embodiment functions both as a pointing device and as a scanning device, which offers user convenience, multi-function capabilities, and the benefit of saving work space both in an office and when traveling. The optical mouse with integrated scanning capabilities makes scanning documents as easy as using a mouse and reduces user costs with the combined functionality.

Although the present disclosure has been described with reference to preferred embodiments, workers skilled in the art will recognize that changes can be made in form and detail without departing from the spirit and scope of the present disclosure.

What is claimed is:

1. A computer accessory device configured to communicate with a computer, comprising:
    a two-dimensional sensor with a pixel array configured to generate image data as the device is moved over a surface;
    a first memory configured to store a first set of images based on a first set of the image data generated by the two-dimensional sensor;
    a second memory configured to store a second set of images based on a second set of the image data generated by the two-dimensional sensor, the second set of images configured to be stitched-together into a stitched-together image; and
    at least one controller configured to generate navigation information based on the first set of images and perform a stitching operation to stitch the second set of images into the stitched-together image, the navigation information indicative of displacement and rotation of the device; an input/output interface configured to transmit the navigation information to the computer to control a screen pointer; and wherein the input/output interface is configured to transmit the stitched-together image to the computer.

2. The computer accessory device of claim 1, wherein the computer accessory device further comprises a third memory configured to store the stitched-together image.

3. The computer accessory device of claim 1, and further comprising:
    a multiple-output multiplexer configured to selectively output the first set of images to the first memory via a first output and the second set of images to the second memory via a second output.

4. The computer accessory device of claim 1, wherein the at least one controller is configured to cause the second set of image data to be generated using light source illumination settings of wavelength and intensity that differ from those used for the first set of image data.

5. The computer accessory device of claim 1, wherein the at least one controller is configured to cause the second set of image data to be generated using an exposure setting of the sensor that is different than that used for the first set of image data.

6. The computer accessory device of claim 1, wherein the first set of image data is generated by the sensor in a time-interleaved manner with the second set of image data generated by the sensor.

7. The computer accessory device of claim 1, wherein the sensor is configured to concurrently generate image data for at least one image in the first set of images and at least one image in the second set of images.

8. The computer accessory device of claim 7, wherein the at least one image in the first set of images is generated by using a smaller portion of the concurrently generated image data and the at least one image in the second set of images is generated by using a larger portion of the concurrently generated image data.

9. The computer accessory device of claim 1, and further comprising:
    a display configured to display the stitched-together image.

10. The computer accessory device of claim 1, wherein the device is an optical mouse.

11. The computer accessory device of claim 1, wherein the device is a USB memory stick.

12. The computer accessory device of claim 1, wherein the device is a mobile phone.

13. The computer accessory device of claim 1, wherein the input/output interface is configured to wirelessly transmit the navigation information and the stitched-together image to the computer.

14. The computer accessory device of claim 1, wherein the at least one controller is configured to associate a set of the navigation information with each image in the second set of images to facilitate stitching of the second set of images.

15. The computer accessory device of claim 1, wherein the at least one controller is configured to store device usage information in at least one of the first memory and the second memory, the device usage information indicating a history of usage of the device.

16. A method of operating a computer accessory device that includes a two-dimensional sensor with a pixel array, comprising:
    generating image data with the sensor as the device is moved over a surface;
    generating a first set of images based on a first set of the image data generated with the sensor;
    generating a second set of images based on a second set of the image data generated with the sensor;
    storing the first and second sets of images in separate memories in the device;
    generating navigation information with the device based on the first set of images, the navigation information indicative of displacement and rotation of the computer accessory device;
    performing a stitching operation to combine the second set of images into a stitched-together image; and transmitting with an input/output interface, the navigation information and the stitched-together image to a computer.

17. The method of claim 16, and further comprising:
    associating a set of the navigation information with each image in the second set of images to facilitate the stitching operation.

18. A computer system, comprising:
a computer; and
a computer accessory device, the device comprising:
- a two-dimensional sensor with a pixel array configured to generate image data for scan images and navigation images as the device is moved over a surface;
- a plurality of memories configured to store the scan images, the navigation images, and stitched-together images;
- at least one controller configured to generate navigation information based on the navigation images, the navigation information indicative of displacement and rotation of the device, the at least one controller also configured to perform a stitching operation to combine the scan images into a first stitched-together image; and
- an input/output interface configured to transmit the navigation information and the first stitched-together image to the computer.

* * * * *